(12) United States Patent
Park et al.

(10) Patent No.: US 7,018,093 B2
(45) Date of Patent: Mar. 28, 2006

(54) APPARATUS AND METHOD FOR SENSING DEFECTS IN TEMPERATURE SENSORS

(75) Inventors: Ki-Hwan Park, Suwon (KR); Jong-Sub Hwang, Suwon (KR); Jeong-Hwan Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 178 days.

(21) Appl. No.: 10/191,482

(22) Filed: Jul. 10, 2002

(65) Prior Publication Data

US 2003/0012254 A1    Jan. 16, 2003

(30) Foreign Application Priority Data

Jul. 11, 2001 (KR) ............................... 2001-41471

(51) Int. Cl.
*G01K 15/00* (2006.01)
(52) U.S. Cl. ................ 374/1; 374/141; 340/653
(58) Field of Classification Search ............ 374/1, 374/10, 11, 33, 43, 44, 129, 141; 340/384, 340/653, 584, 384.1; 702/116, 104, 130, 702/133, 136
See application file for complete search history.

(56) References Cited

U.S. PATENT DOCUMENTS

| | | | | |
|---|---|---|---|---|
| 4,058,975 A | * | 11/1977 | Gilbert et al. ......... 60/39.281 |
| 4,320,285 A | * | 3/1982 | Koether ................. 219/497 |
| 4,475,823 A | * | 10/1984 | Stone ......................... 374/1 |
| 4,627,740 A | * | 12/1986 | Jerde et al. ................. 374/1 |
| 4,843,577 A | * | 6/1989 | Muramoto ............... 374/102 |
| 4,886,590 A | * | 12/1989 | Tittle ....................... 204/232 |
| 4,901,257 A | * | 2/1990 | Chang et al. ............... 374/1 |
| 5,215,704 A | * | 6/1993 | Hirota ...................... 374/39 |
| 5,235,527 A | * | 8/1993 | Ogawa et al. ........... 702/116 |
| 5,596,513 A | * | 1/1997 | Schricker ................ 702/130 |
| 5,629,872 A | * | 5/1997 | Gross et al. ............. 702/116 |
| 5,680,409 A | * | 10/1997 | Qin et al. ................. 714/799 |
| 5,712,467 A | * | 1/1998 | Straka et al. ............ 219/497 |
| 5,719,378 A | * | 2/1998 | Jackson et al. ............. 374/1 |

(Continued)

FOREIGN PATENT DOCUMENTS

JP        57033332 A  *  2/1982

(Continued)

*Primary Examiner*—Gail Verbitsky
*Assistant Examiner*—Mirellys Jagan
(74) *Attorney, Agent, or Firm*—Volentine Francos & Whitt, pllc (57) ABSTRACT

In a temperature controlling apparatus for controlling temperature by using a temperature sensor, a defect state of the temperature sensor is sensed by sensing a change of specific resistance of the temperature sensor. A temperature value of the temperature sensor is detected at each unit time during exchanging of a chemical solution or stopping of a process in a chamber of the semiconductor fabricating process. A lowest temperature among the detected temperature values and a reference temperature predetermined to sense the change of the specific resistance of the temperature sensor, are compared with each other. When the lowest temperature deviates from the reference temperature, a defect of the temperature sensor is confirmed and a message indicative of a defect state and an alarm are generated.

10 Claims, 5 Drawing Sheets

U.S. PATENT DOCUMENTS

| | | | |
|---|---|---|---|
| 5,758,304 A * | 5/1998 | Bray | 701/63 |
| 5,902,043 A * | 5/1999 | Price et al. | 374/1 |
| 6,007,239 A * | 12/1999 | Nickol | 374/1 |
| 6,016,465 A * | 1/2000 | Kelly | 702/116 |
| 6,139,180 A * | 10/2000 | Usher et al. | 374/1 |
| 6,200,021 B1 * | 3/2001 | Mitsutani et al. | 374/1 |
| 6,238,589 B1 * | 5/2001 | Cooper et al. | 216/84 |
| 6,283,092 B1 * | 9/2001 | Jung | 123/339.15 |
| 6,398,846 B1 * | 6/2002 | Lorimer et al. | 95/14 |
| 6,508,584 B1 * | 1/2003 | Blankenagel | 374/1 |
| 6,709,152 B1 * | 3/2004 | Bronlund | 374/3 |

FOREIGN PATENT DOCUMENTS

| | | | |
|---|---|---|---|
| JP | 57066311 A * | 4/1982 | |
| JP | 57094621 A * | 6/1982 | |
| JP | 03046528 A * | 2/1991 | |
| KR | P1998-066186 | 10/1998 | |

* cited by examiner

NORMAL TEMPERATURE SENSOR

FIG. 4B

CORRODED TEMPERATURE SENSOR

FIG. 5

APPARATUS AND METHOD FOR SENSING DEFECTS IN TEMPERATURE SENSORS

The present application claims priority under 35 U.S.C. §119 to Korean Application 2001-41471 filed on Jul. 11, 2001, which is hereby incorporated by reference in its entirety for all purposes.

BACKGROUND OF THE INVENTION

1. Field of the Invention

The present invention relates to a temperature controlling apparatus, and more particularly, to an apparatus and method for sensing defects of a temperature sensor that is used in an apparatus for controlling temperature, by sensing a change of specific resistance of the temperature sensor.

2. Description of the Related Art

In general, a semiconductor device is fabricated by performing various processes, and during performance of such various processes, various kinds of chemicals are used. Processes using chemicals are mainly performed by using a bath which stores the chemical solution. Semiconductor fabricating processes that use such a bath may include etching processes for removing an unnecessary film or cleaning processes for a wafer. Such cleaning and etching processes generally utilize an overflow system in which the processes are performed by overflowing pure water and chemicals in the bath.

In a wet/clean station that includes wet equipment using such chemicals, first and second baths are provided for cleaning, and a QDR (Quick Drop Rinse) bath and a final bath are also included. During a cleaning process or a wet etching process using chemicals in such baths as described, temperature appropriate for the chemical processes should be uniformly maintained, to gain a desired process effect. That is, since a relation between temperature and an etching rate depends on characteristics of the chemicals, the etching rate changes according to an increase or a decrease in temperature, to thus result in overetching or underetching and poor product quality.

A chemical temperature controlling apparatus for addressing such problems is disclosed in Korean Opened Patent Publication No. 1998-066186. In Korean Opened Patent Publication No. 1998-066186, a value of the normal temperature is periodically measured, and a determination temperature is changed according to the measured value, so as to maintain temperature of a semiconductor fabricating process equipment at the changed determination temperature value and control it as an optimum process condition temperature.

Figure 1A:
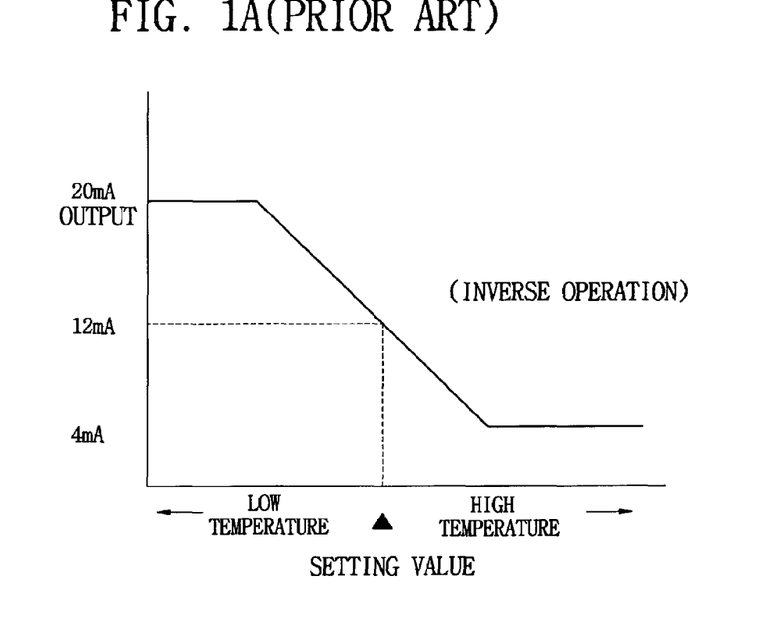
FIG. 1A is a graph descriptive of an inverse operation of a temperature sensor.
Figure 1B:
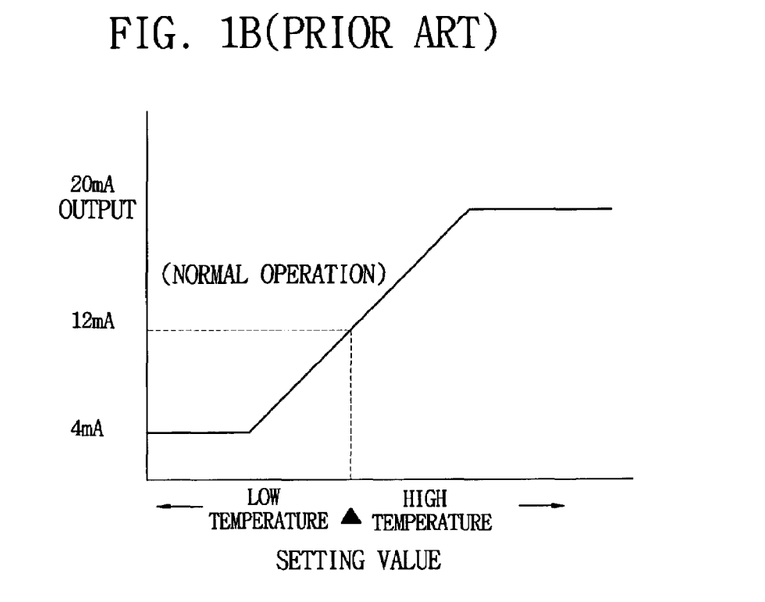
FIG. 1B is a graph descriptive of a normal operation of a temperature sensor.

Such a temperature controlling apparatus as noted above senses a change of resistance of the temperature sensor indicative of highness and lowness of temperature. In other words, when current temperature is lower than a determination value, electrical power is supplied to a heater to drive the heater, and when the current temperature is higher than the determination value, electrical power to the heater is cut off to maintain constant temperature. Such temperature controlling apparatus turns the heater power on/off according to temperature detected by the temperature sensor. A state in which the heater becomes powered-on is a normal operation, and a state in which the heater is powered-off and cooled is an inverse operation, whereby current (I)=voltage (V)/resistance(R) in accordance with Ohms law, such that resistance and current inversely operate. Therefore, in the case of an inverse operation, the resistance of the temperature sensor increases as shown in FIG. 1A and current then decreases, so that temperature of the semiconductor fabrication process is controlled to decrease. In the case of a normal operation, when the resistance of the temperature sensor decreases as shown in FIG. 1B and current then increases, temperature of the semiconductor fabrication process is controlled to increase.

Accordingly, when a temperature sensor is corroded and thereby disconnected, or when the specific resistance of the temperature sensor increases, the detected temperature by the temperature sensor becomes higher than the actual temperature. In other words, in a case of a 3.8 Ω increase in specific resistance, the detected temperature of the chemical bath is increased by 10° C. Even if the determined temperature is controlled under a state that the actual temperature becomes heightened due to an increase of the specific resistance of the temperature sensor, a temperature of the solution of chemical bath does not reach temperature determined actually. Further, when the temperature sensor is corroded and thereby shorts, or if the specific resistance is reduced, the detected temperature by the temperature sensor becomes lower than the actual temperature. Even if the determined temperature is controlled under such a state that the actual temperature becomes low, a temperature of solution of the chemical bath becomes higher than the actually determined temperature. Therefore, despite that the temperature of the solution of the chemical bath is higher or lower than the actually determined temperature, it is recognized that the solution has reached the determined temperature, to thus cause a defect in the semiconductor fabricating process.

SUMMARY OF THE INVENTION

The present invention is therefore directed to an apparatus and method for sensing a defect of a temperature sensor, which substantially overcome one or more of the problems due to the limitations and disadvantages of the related art.

A primary object of the present invention is to provide an apparatus and method for sensing a defect of a temperature sensor by measuring a change value of specific resistance of a temperature sensor which is installed within a chemical bath or a process chamber.

Another object of the present invention is to provide an apparatus and method for sensing a defect state of a temperature sensor installed within a chemical bath or a process chamber, to thus generate an alarm.

A still another object of the present invention is to provide an apparatus and method for sensing a defect of a temperature sensor, which is capable of recognizing a defect state of the temperature sensor by sensing a change of specific resistance value of the temperature sensor which is caused by corrosion (a disconnection or a short), or a change of an outside environment.

In accordance with the present invention for achieving these objects, a temperature sensor defect sensing apparatus in a temperature controlling apparatus includes a temperature sensor which is installed in a lower stage of a chemical bath and that senses temperature of a chemical solution; and a temperature controller that outputs a control signal which represents a temperature value detected from the temperature sensor, that stores determination reference temperature which corresponds to a specific resistance value of the temperature sensor, that compares the temperature value detected from the temperature sensor with the determination reference temperature corresponding to the specific resistance value every constant unit time during a determined time when exchanging the chemical solution or stopping a process progression, that discriminates a defect state of the temperature sensor, and that outputs a defect state representation control signal and an alarm control signal.

In accordance with the purpose of the present invention, and in an aspect of the present invention for achieving these and other advantages, in a method of sensing a defect of the temperature sensor, a temperature value of the temperature sensor is detected every constant unit time during a determined time when exchanging a chemical solution or stopping a process progression of a chamber in the midst of a semiconductor fabricating process, and a lowest temperature among the detected temperature values is compared with a reference temperature predetermined to sense a change of a specific resistance of the temperature sensor, to thereby sense a defect state of the temperature sensor as when the lowest temperature deviates from the reference temperature.

In the inventive method of sensing a defect of the temperature sensor, a temperature value of the temperature sensor is detected every constant unit time during a determined time that heating temperature is cooled and falls to the normal temperature when stopping a heating operation after performing a detection operation of the heating temperature, and the lowest temperature among the detected temperature values is compared with a reference temperature predetermined to sense a change of a specific resistance of the temperature sensor, to thereby sense a defect state of the temperature sensor as when the lowest temperature deviates from the reference temperature.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENT

Reference will now be made in detail to the preferred embodiments of the present invention, examples of which are illustrated in the accompanying drawings. In the inventive description, detailed explanation of well known features will be omitted so as not to unnecessarily dim the gist of the present invention.

Figure 2:
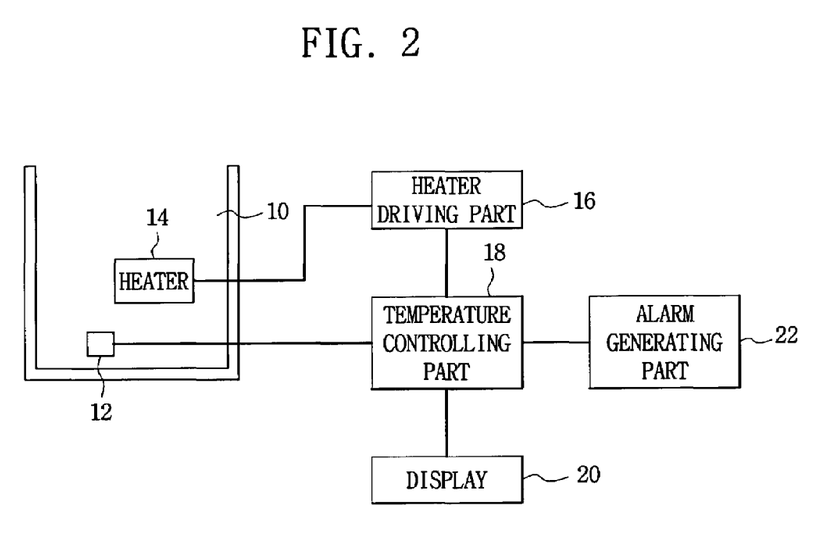
FIG. 2 illustrates a block diagram of a chemical temperature controlling apparatus of an embodiment of the present invention.

FIG. 2 is a block diagram of a chemical temperature controlling apparatus of an embodiment of the present invention. Herewith, it is constructed by a chemical bath 10 for storing chemical solution; a temperature sensor 12 which is installed in a lower stage of the chemical bath 10 and which senses temperature of a chemical solution; a heater 14 for heating the chemical solution stored in the chemical bath 10; a temperature controlling part 18 for detecting temperature sensed from the temperature sensor 12 and comparing it with predetermined temperature to thus output a heater driving control signal, for outputting a control signal representing a temperature value detected from the temperature sensor 12, for storing a determination reference temperature corresponding to a specific resistance value of the temperature sensor 12, for comparing the temperature value detected from the temperature sensor 12 with the determination reference temperature corresponding to a specific resistance value every constant unit time during a determined time when exchanging chemical solution or stopping a process progression, for discriminating a defect state of the temperature sensor, and for outputting a defect state representation control signal and an alarm control signal; a heater driving part 16 for receiving a control signal from the temperature controlling part 18, and driving the heater 14; a display 20 for representing temperature of the chemical solution and a defect state message of the temperature sensor 12; and an alarm generating part 22 for receiving an alarm control signal based on a discrimination of a defect state of the temperature sensor 12 from the temperature controlling part 18, and generating an alarm.

Figure 3:
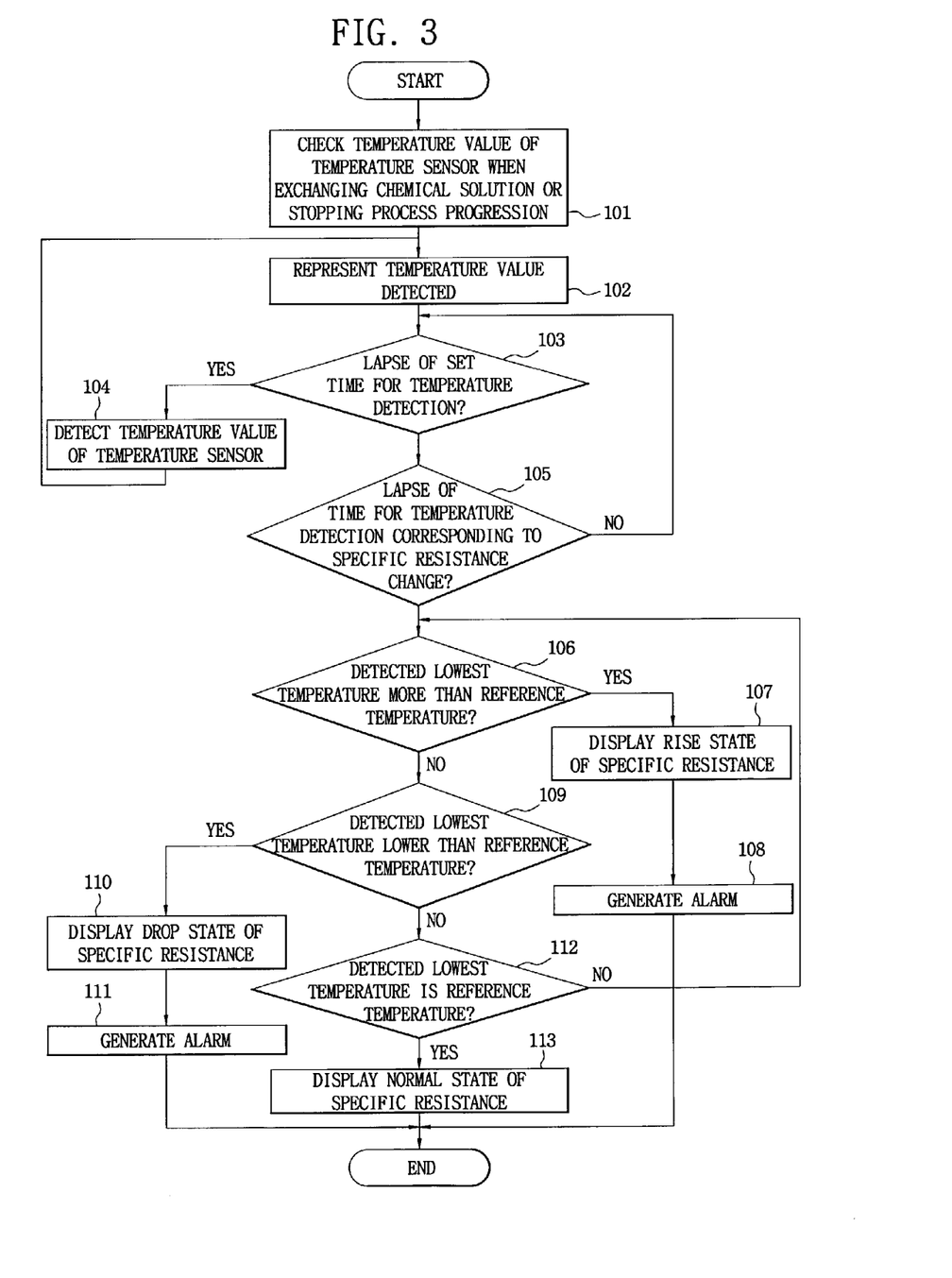
FIG. 3 shows a control flowchart for generating an alarm by sensing a defect of a temperature sensor in an embodiment of the present invention.
Figure 4A:
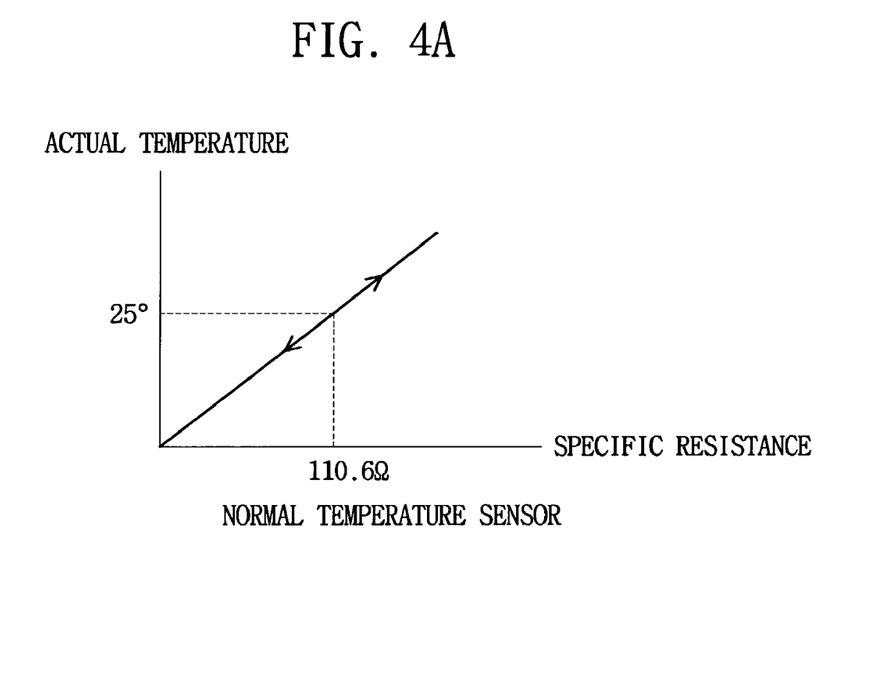
FIG. 4A is a graph of a temperature characteristic corresponding to a specific resistance under a normal state of a temperature sensor in an embodiment of the present invention.
Figure 4B:
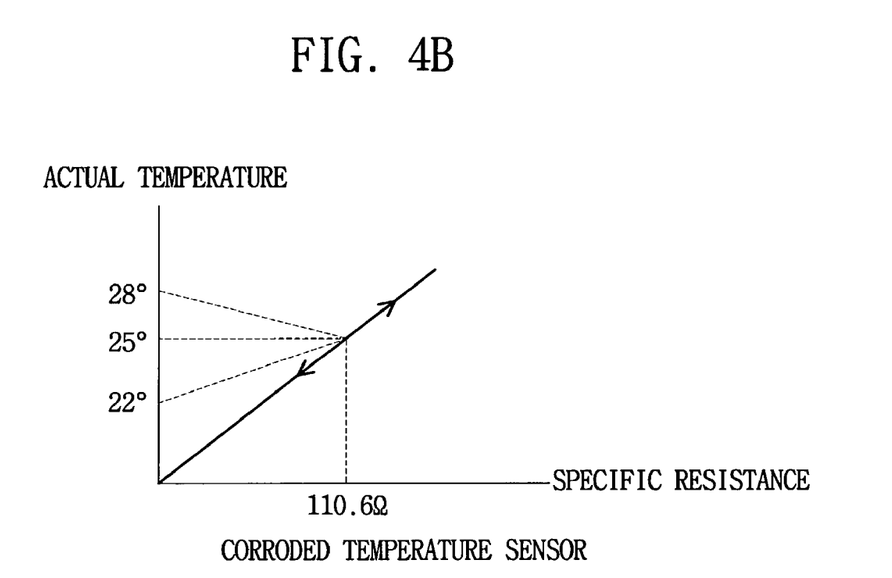
FIG. 4B is a graph of a temperature characteristic corresponding to a specific resistance under a corrosion state of a temperature sensor in an embodiment of the present invention.
Figure 5:
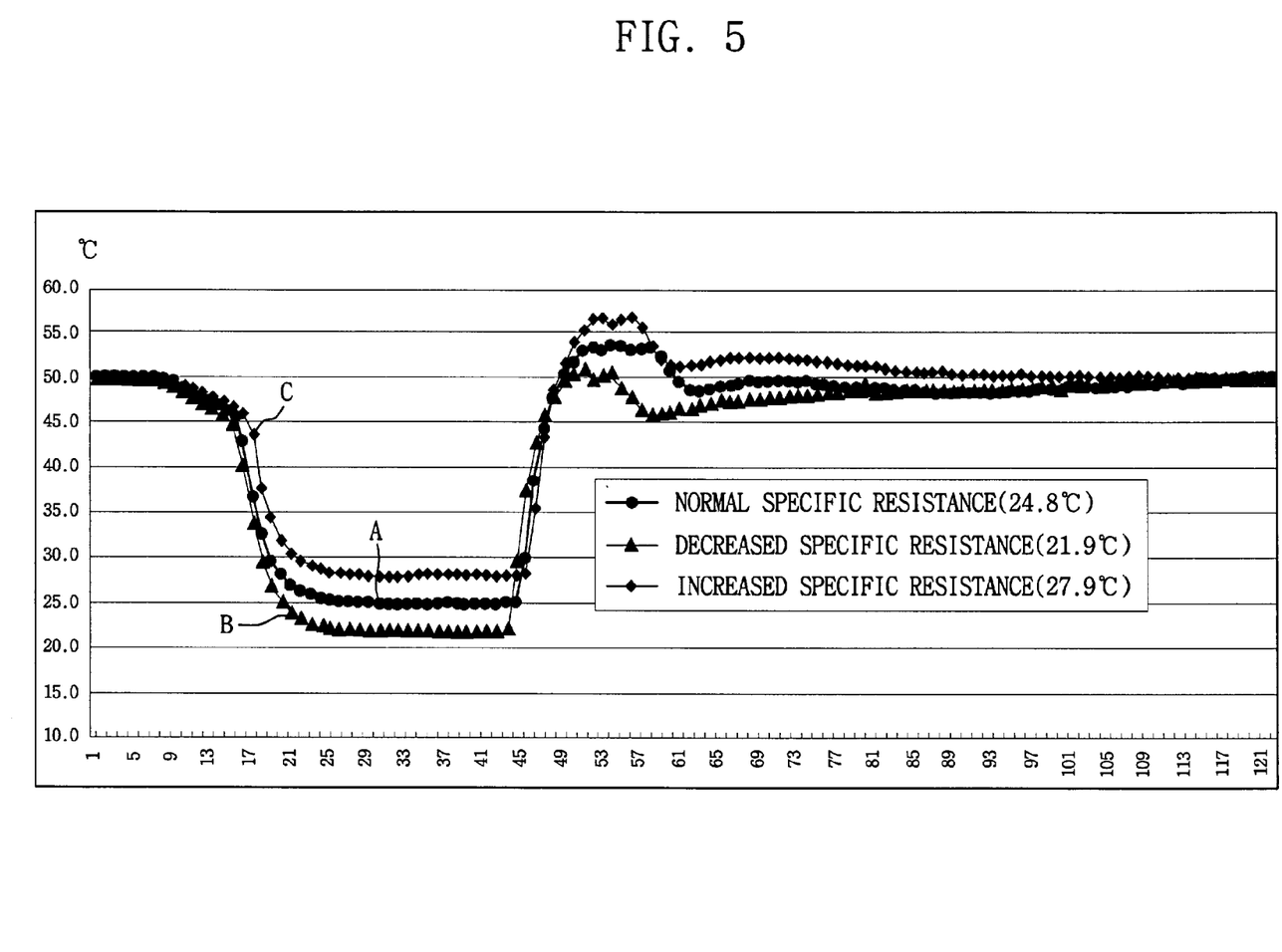
FIG. 5 is a characteristic diagram of a temperature characteristic change state of a specific resistance of a temperature sensor based on a time change during exchanging of chemical solution in an embodiment of the present invention.

FIG. 3 shows a control flowchart for generating an alarm by sensing a defect of a temperature sensor in an embodiment of the present invention. FIG. 4A is a graph of a temperature characteristic corresponding to a specific resistance under a normal state of the temperature sensor in an embodiment of the present invention, and FIG. 4B is a graph of a temperature characteristic corresponding to a specific resistance under a corrosion state of the temperature sensor in an embodiment of the present invention. FIG. 5 is a characteristic diagram of a temperature characteristic change state of a specific resistance of the temperature sensor based on a time change during exchanging of chemical solution in an embodiment of the present invention.

Referring to FIGS. 2 through 5, an operation of the preferred embodiments in the present invention is described in detail, as follows. The chemical bath 10 stores chemical solution. At this time, the temperature sensor 12 installed in a lower stage of the chemical bath 10, senses temperature of the chemical solution, and provides a signal indicative thereof to the temperature controlling part 18. The temperature controlling part 18 detects the temperature sensed by the temperature sensor 12, compares it with a predetermined temperature to maintain it as a constant temperature, and outputs a heater driving control signal. Then, the heater driving part 16 is controlled by the temperature controlling part 18, to drive the heater 14. The heater 14 heats the chemical solution stored in the chemical bath 10, and controls it to a determined temperature. The temperature controlling part 18 continuously detects a temperature value sensed by the temperature sensor 12, and turns the heater driving part 16 off and provides control so that heating of the chemical solution stored in the chemical bath 10 is stopped when it becomes a predetermined temperature, in order to maintain the temperature of the chemical solution as a constant temperature. Thereby, the temperature is controlled so that the chemical solution stored in the chemical bath 10 is maintained as a constant temperature.

When a constant period has elapsed after progressing through such a process procedure, the process operation should be stopped and the chemical solution should be exchanged. When exchanging the chemical solution, the chemical solution is discharged and new chemical solution is supplied, and then when a determined time lapses, the chemical solution falls to a lowest temperature of for example 25° C. as the normal temperature. After that, the temperature controlling part 18 controls the heater driving part 16, to drive the heater 14 and increase the temperature of the chemical solution. At this time, the temperature controlling part 18 outputs a control signal to represent a temperature value detected by the temperature sensor 12, and represents temperature of the detected chemical solution on the display 20. The temperature controlling part 18 stores the determination reference temperature corresponding to a specific resistance value of the temperature sensor 12, and detects and stores the detected temperature value from the temperature sensor 12 every constant unit time (for example, 10 seconds) during a predetermined time (for instance 180 seconds), when exchanging the chemical solution or stopping a process progression.

Then, in subsequent processings, when the lowest value of the detected temperature is detected from the temperature sensor 12, and after that, when the predetermined time (for example 180 seconds) lapses and the chemical solution is slowly increased in temperature by driving of the heater 14, the temperature controlling part 18 compares the determination reference temperature corresponding to the predetermined specific resistance value with the detected lowest temperature value. If the comparison result is higher or lower than the determination reference temperature, it is determined that a defect state of the temperature sensor 12 exists. If it is decided the defect state of the temperature sensor 12 exists, the temperature controlling part 18 controls the display 20 to indicate a defect state message and to simultaneously control the alarm generating part 22 and generate an alarm.

The determination reference temperature corresponding to the specific resistance value is decided by several repetitive experiments of a temperature value which falls to the lowest temperature value, by using the normal temperature sensor 12 when exchanging the chemical solution or in stopping the process. In case that the temperature sensor 12 is normal, for instance in the case of a specific resistance value of 110.6 Ω, the temperature of the chemical solution should be 25° C. and this becomes the determination reference temperature as shown in FIG. 4A. However, in the case that the temperature sensor 12 corrodes, for example in the case that the specific resistance is increased by 1.155 Ω as shown in FIG. 4B, the measured temperature falls by 3° C. and becomes 22° C. Oppositely, in case that the specific resistance drops by 1.155 Ω, the measured temperature is increased by 3° C. and becomes 28° C.

Therefore, as shown in FIG. 5, the temperature controlling part 18 detects temperature of the temperature sensor 12 during exchanging of the chemical solution, and represents it on the display 20. Referring to FIG. 5, when the discharging operation starts to exchange the chemical solution stored within the chemical bath 10, the temperature controlling part 18 detects the temperature value from the temperature sensor 12 per a determined time unit, for example, per unit of 10 seconds. The temperature value detected from the temperature sensor 12 slowly drops accordingly as time lapses, and falls to the lowest temperature (25±0.3° C.) corresponding to the specific resistance of the temperature sensor. At this time, if the temperature sensor 12 is in a normal state, and if the lowest temperature falls to 25° C. as shown by A of FIG. 5 and then a determined time of for instance 180 seconds lapses, the heater 12 is again driven and the temperature increases.

However, in case that a break is caused in a resistance of the temperature sensor 12 and the specific resistance drops, the lowest temperature falls to 21.5° C. as shown by B of FIG. 5, and after that, in the case that the determined time of for instance 180 seconds lapses, the heater 12 is again driven so as to increase the temperature. In case that the lowest temperature falls to 28° C. because of a short etc. of the temperature sensor 12 as shown in C of FIG. 5, and after that, in the case that the determined time of for instance 180 seconds lapses, the heater 12 is again driven so as to increase the temperature. Therefore, the temperature controlling part 18 determines the occurrence of a defect in the temperature sensor 12 in a case that the lowest temperature is detected lower than the determined reference temperature (25° C.), as shown in B of FIG. 5 or is detected higher than the determined reference temperature as shown in C of FIG. 5. After that, in case that the heater 14 is driven, the temperature increases.

With reference to a flowchart of FIG. 3, in the inventive method for detecting temperature of the temperature sensor 12 from the temperature controlling part 18 to detect a defect state of the temperature sensor and generating an alarm, the temperature controlling part 18 detects a temperature value from the temperature sensor 12 during exchanging of chemical solution or stopping a process progression in a step 101, and then processing proceeds to a step 102. In the step 102, the temperature controlling part 18 represents the detected temperature value on the display 20, and processing then proceeds to a step 103. In the step 103, the temperature controlling part 18 checks whether the determination time (for instance, 10 seconds) for a detection of temperature has lapsed, and when the determination time has lapsed, processing proceeds to a step 104. In the step 104, the temperature controlling part 18 detects the temperature value from the temperature sensor 12, and stores it in an internal memory, and processing proceeds to the step 102. Such operation is repetitively performed, and the temperature value is detected from the temperature sensor 10 at each determination time, for example every 10 seconds, and is stored in the internal memory.

Then, in a step 105, it is checked whether or not a time for detecting temperature corresponding to a specific resistance change of the temperature sensor 10 has lapsed. The time for the temperature detection corresponding to a specific resistance change is the time required to detect a temperature which falls to the lowest temperature during exchanging of the chemical solution or stopping a process progression. If the time for the temperature detection corresponding to the specific resistance change did not lapse, processing returns to the step 103 to continuously detect the temperature of the temperature sensor 12. But, if the time for the temperature detection corresponding to the specific resistance change has lapsed, processing proceeds to a step 106, and the temperature controlling part 18 detects whether the lowest temperature among temperatures values detected and stored at the internal memory is more than the reference temperature. If the lowest temperature is more than the reference temperature, processing proceeds to a step 107 to recognize the current state as state C of FIG. 5, control the display 20, and represent the increased and changed state of the specific resistance of the temperature sensor 12 on the display 20. The reference temperature corresponding to the specific resistance indicates the temperature which falls to the lowest temperature during exchanging of the chemical solution or stopping the process progression under a normal state of the temperature sensor 12. After that, in a step 108, the temperature controlling part 18 controls the alarm generating part 22 to generate an alarm for informing of a defect state of the temperature sensor 12.

If the lowest temperature is not more than the reference temperature in step 106, processing proceeds to a step 109, and the temperature controlling part 18 checks whether the lowest temperature is lower than the reference temperature. If the lowest temperature is lower than the reference temperature, processing proceeds to a step 110. In the step 110, the temperature controlling part 18 recognizes the current state as state B of FIG. 5, to control the display 20 and to thus indicate on the display 20 the state that the specific resistance of the temperature sensor 12 is falling. And then, in a step 111, the temperature controlling part 18 controls the alarm generating part 22 to generate an alarm for informing of a defect state of the temperature sensor 12. However, if the detected lowest temperature is not lower than the reference temperature in step 109, processing proceeds to a step 112 and the temperature controlling part 18 checks whether or not the lowest temperature among temperature values detected and stored in the internal memory is the same as the reference temperature. If the detected lowest temperature is the same as the reference temperature, processing proceeds to a step 113 and the temperature controlling part 18 recognizes the current state as state A of FIG. 5, to control the display 20 to indicate on the display that the state of the specific resistance of the temperature sensor 12 is the normal state. On the other hand, if the detected lowest temperature is determined to not be the same as the reference temperature in step 112, processing returns to step 106.

In the inventive embodiment, a temperature sensing sensor installed within a chemical bath in a semiconductor fabricating process is described in order to sense a defect of the temperature sensor. However, the temperature sensing sensor installed within a chamber used in a semiconductor fabricating process can also sense a defect state of the temperature sensor by the above described method. Further, the preferred embodiments describe a temperature sensor used in a semiconductor fabricating process, but the preferred embodiments may be used in all various equipment which use a temperature sensor, so that a defect state of the temperature sensing sensor can be determined to thereby prevent erroneous temperature control.

In the inventive embodiment, the defect of the temperature sensor during exchanging of chemical solution or in stopping a chamber process of semiconductor fabricating processes is sensed. However, in other embodiments of this invention, a detection operation of heating temperature is performed by the temperature sensor, and after that, every constant unit time during a determination time in which that the heating temperature is cooled and is dropped till the normal temperature in a stopping of a heating operation, a temperature value of the temperature sensor is detected. Then, the lowest temperature among the detected temperature values and the reference temperature predetermined to sense a specific resistance change of the temperature sensor are compared with each other. Therefore, when the lowest temperature deviates from the reference temperature, this can be considered as indicative of a defect of the temperature sensor.

As previously noted in accordance with the present invention, a reference temperature corresponding to a specific resistance value is determined in a temperature controlling equipment, and after that in the case that the lowest temperature detected by comparing the lowest temperatures detected from a temperature sensor deviates from a reference temperature value, a defect state can be recognized as caused due to a short etc. of the temperature sensor. In this manner, the defect state of the temperature sensor is recognized, and temperature of chemical solution or temperature within a chamber can be definitely controlled in the semiconductor fabricating process, so that wafer defects can be prevented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of sensing a defect of a temperature sensor adapted to measure a temperature of a chemical solution, comprising:
   detecting a temperature value of the temperature sensor at each unit time over a time period during exchanging of the chemical solution or stopping of a process in a chamber during a semiconductor fabricating process using the chemical solution;
   comparing a lowest temperature value among the detected temperature values with a reference temperature to sense a change of a specific resistance of the temperature sensor; and
   determining that the temperature sensor is defective when the lowest temperature value deviates from the reference temperature.

2. The method of claim 1, further comprising providing a message indicative of a defect state when the temperature sensor is determined to be defective.

3. The method of claim 1, further comprising providing an alarm indicative of a defect state when the temperature sensor is determined to be defective.

4. An apparatus for sensing a defect of a temperature sensor in a temperature controlling apparatus, the temperature sensor sensing a temperature of a chemical solution stored in a chemical bath, the apparatus comprising:
   a temperature controller that outputs a control signal which represents a temperature value detected from the temperature sensor, stores a determination reference temperature which corresponds to a specific resistance value of the temperature sensor, compares the temperature value detected from the temperature sensor with the determination reference temperature corresponding to the specific resistance value at each unit time over a time period during exchanging of the chemical solution or stopping of a fabrication process using the chemical solution, discriminates a defect of the temperature sensor based on the comparison, and outputs a defect state representation control signal and an alarm control signal.

5. An apparatus for sensing a defect of a temperature sensor in a temperature controlling apparatus, the temperature sensor sensing a temperature of a chemical solution stored in a chemical bath, the apparatus comprising:
   a temperature controller that outputs a control signal which represents a temperature value detected from the temperature sensor, stores a determination reference temperature which corresponds to a specific resistance value of the temperature sensor, compares the temperature value detected from the temperature sensor with the determination reference temperature corresponding to the specific resistance value at each unit time over a time period during exchanging of the chemical solution or stopping of a fabrication process using the chemical solution, discriminates a defect state of the temperature sensor based on the comparison, and outputs a defect state representation control signal and an alarm control signal; and
   a display that displays a temperature of the chemical solution, and displays a defect state message of the temperature sensor responsive to the defect state representation control signal output by the temperature controller.

6. The apparatus of claim 5, further comprising an alarm generator that receives the alarm control signal and that generates an alarm.

7. The apparatus of claim 5, wherein the temperature controller further outputs a heater driving control signal adapted to control heating of the chemical solution in response to a signal from the temperature sensor.

8. A method of sensing a defect of a temperature sensor, comprising:
   detecting a temperature value of the temperature sensor at each unit time while heating temperature cools and falls to a normal temperature when a heating operation is stopped; and
   comparing a lowest temperature value among the detected temperature values with a reference temperature to sense a change of a specific resistance of the temperature sensor; and
   sensing a defect state of the temperature sensor when the lowest temperature value deviates from the reference temperature,
   wherein sensing a defect state of the temperature sensor includes sensing a break in a resistance of the temperature sensor in response to the lowest temperature value among the detected temperature values being less than the reference temperature.

9. A method of sensing a defect of a temperature sensor, comprising:
   detecting a temperature value of the temperature sensor at each unit time while heating temperature cools and falls to a normal temperature when a heating operation is stopped; and
   comparing a lowest temperature value among the detected temperature values with a reference temperature to sense a change of a specific resistance of the temperature sensor; and
   sensing a defect state of the temperature sensor when the lowest temperature value deviates from the reference temperature,
   wherein sensing a defect state of the temperature sensor includes sensing a short in a resistance of the temperature sensor in response to the lowest temperature value among the detected temperature values being greater than the reference temperature.

10. A method of sensing a defect of a temperature sensor, comprising:
   storing a reference temperature value corresponding to an expected output value from the temperature sensor at a reference temperature;
   detecting a temperature value output by the temperature sensor when an actual temperature of the temperature sensor is the reference temperature;
   comparing the detected temperature value with the reference temperature value; and
   generating an alarm indicating that the temperature sensor is defective, in response to a result of the comparison between the reference temperature value and the detected temperature value, wherein detecting a temperature value output by the temperature sensor when an actual temperature of the temperature sensor is the reference temperature, comprises:
     (a) detecting a trial temperature value of the temperature sensor;
     (b) checking for expiration of a first time interval, and repeating step (a) when the first time interval expires;
     (c) checking for expiration of a second time interval, and repeating steps (a) and (b) until the second time interval expires; and
     (d) determining the temperature value of the temperature sensor when the temperature of the temperature sensor is the reference temperature by determining the lowest detected trial temperature value during the second time interval.

* * * * *